United States Patent [19]
Luckcuck

[11] 3,871,052
[45] Mar. 18, 1975

[54] POWER LAWN MOWER VACUUM ATTACHMENT

[76] Inventor: Robert C. Luckcuck, 2008 Verdugo Pl., Fullerton, Calif. 92633

[22] Filed: Sept. 7, 1973

[21] Appl. No.: 395,003

[52] U.S. Cl................................. 15/328, 56/13.1
[51] Int. Cl.............................................. A471 9/00
[58] Field of Search ............ 15/328, 331, 334, 338; 37/43 L; 56/13.1, DIG. 8

[56] References Cited
UNITED STATES PATENTS

| | | | |
|---|---|---|---|
| 918,896 | 4/1909 | Noe | 15/334 |
| 2,930,068 | 3/1960 | Evanson et al. | 15/328 UX |
| 3,142,913 | 8/1964 | Jacob | 15/328 X |
| 3,373,514 | 3/1968 | Forren | 15/328 X |
| 3,491,399 | 1/1970 | Dolan et al. | 15/328 X |
| 3,676,893 | 7/1972 | Smythe | 15/328 |

FOREIGN PATENTS OR APPLICATIONS

| | | | |
|---|---|---|---|
| 72,183 | 7/1916 | Austria | 15/334 |

*Primary Examiner*—Billy J. Wilhite
*Assistant Examiner*—C. K. Moore
*Attorney, Agent, or Firm*—Robert C. Luckcuck

[57] ABSTRACT

A vacuum attachment for a power lawn mower comprising an air intake portion and a cover member. The vacuum attachment is adapted for mounting on the underside of a power mower.

1 Claim, 6 Drawing Figures

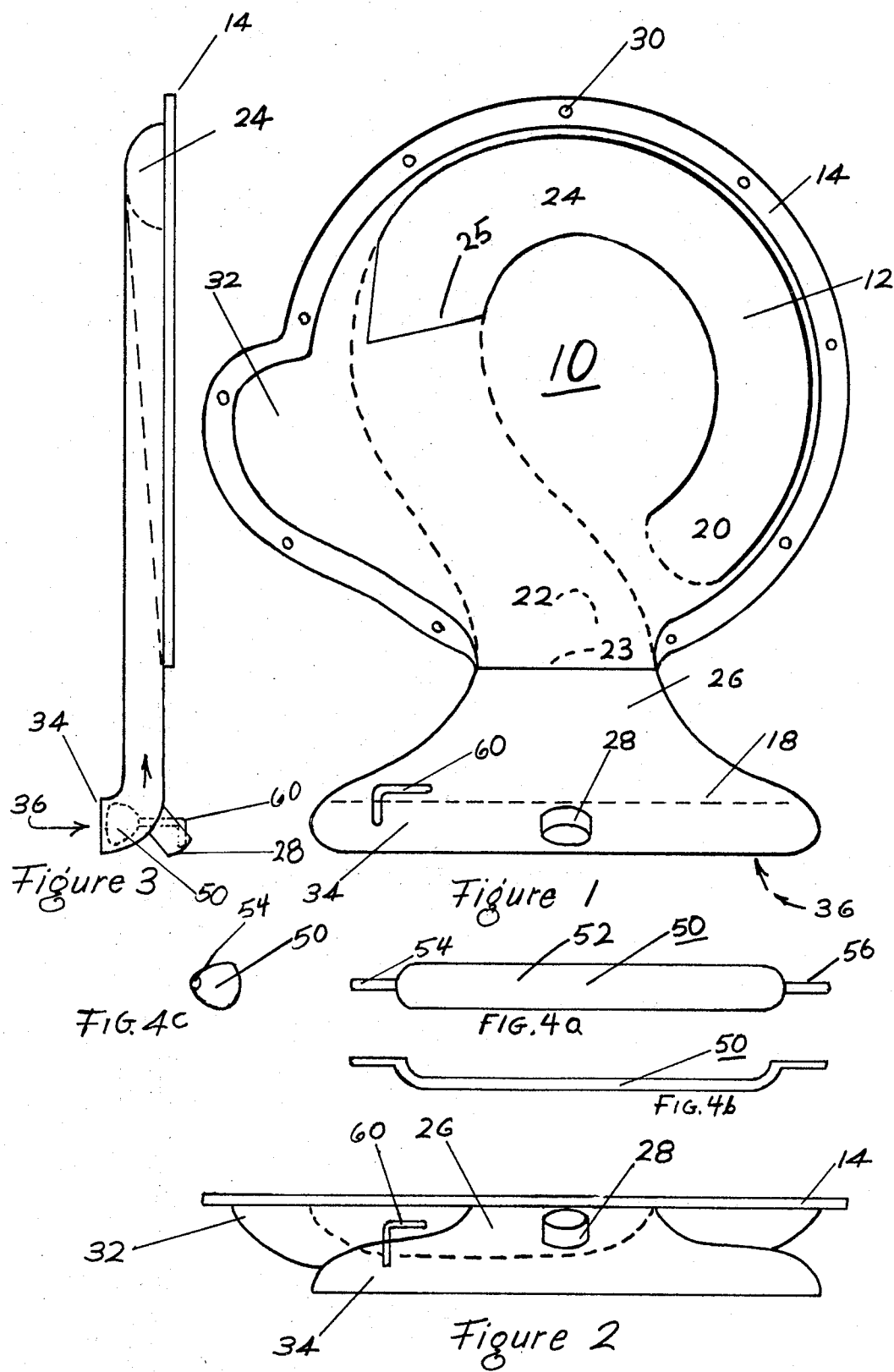

POWER LAWN MOWER VACUUM ATTACHMENT

The present invention relates to a vacuum attachment, particularly one attachable to a power lawn mower.

Power lawn mowers are in wide use and familiar to the public at large. Such lawn mowers are used for cutting grass, etc., and are of limited use.

The present invention permits power lawn mowers to be put to a different and additional types of use, namely, for vacuuming garages, driveways, etc. and, in a further embodiment, for use with a vacuum hose.

FIG. 1 is a plan view of the lawn mower vacuum attachment of the present invention.

FIG. 2 is a front elevation view of the attachment in FIG. 1.

FIG. 3 is a side elevation view of the attachment in FIG. 1.

FIGS. 4a, 4b, and 4c are, respectively, plan, front elevation, and side elevation views of a manifold element that can be employed in one embodiment of the invention.

The present invention comprises a lawn mower vacuum attachment unit 10 (FIGS. 1 to 3) comprising a cover member 12, an air intake member 18, and a passageway 22 having an air inlet opening 23 adjacent to the air intake member 18 and an air outlet opening 25 at an interior region of the cover member 12. The cover member 12 is generally dish-shaped and includes a rim portion 14 that generally conforms in size and shape to the underside of the rotary lawn mower with which it is to be used, the cover element 12 substantially completely closing off the underside of the lawn mower such that substantially all of the air entering the underside of the lawn mower passes first through the air intake member 18. The cover element 12 can be attached to the underside of the lawn mower by, for example, bolts inserted through the apertures 30 in the cover element rim 14 (which is flush with the underside, it being possible to have a gasket between the rim 14 and the lawn mower); alternatively, the cover element 12 can be so connected by, for example, clips, springs, stops, etc. The cover element 12 is sufficiently deep, i.e., the side walls 32 are sufficiently high, as to permit the cutting blade of the mower to clear and to move unobstructed.

The intake member 18 comprises a downward opening spout portion 34 which has a restricted opening through which air enters, as shown by the arrows 36 (FIGS. 1 and 2), the opening being adjacent the vacuumed area when the attachment 10 is mounted on the mower. The intake member 18 preferably narrows down to a throat portion 26 which communicates with the air inlet opening 23, to enhance the vacuum effect. At the air outlet opening 25, the passageway 22 includes a trough portion 24 that gradually ascends toward the end 20 of the trough 24, the passageway 22 (including the trough portion 24) preferably has a convoluted configuration as shown.

In a further embodiment of the invention, the attachment 10 further comprises at the air intake member 18 a second spout 28 that leads to the interior of the air intake member 18. A separate vacuum hose (not shown) can be attached to the second spout 28 and used for vacuuming dirt, leaves, etc. When the second spout 28 is not in use, the vacuuming operation can be made more efficient by closing off the spout 28, as with a cork, cap, etc.

In a still further embodiment, the attachment 10 comprises an air intake valve flap 50 (FIGS. 4a to 4c) that is pivotably mounted in the air intake member 18 so as to be positioned to block the entry of air via either the spout portion 34 or the second spout member 28, thereby permitting the use of one or the other. The valve flap 50 comprises a central portion 52 that is of such size and configuration as to close off substantially all of the opening in the spout 34 as well as the opening in spout 28. The valve flap 50 comprises hinge pins 54, 56 at the respective ends thereof, which pins engage (removably or fixedly) the interior surface of the intake member 18, a female receptacle being providable at this interior surface for receiving the hinge pins 54, 56. The valve flap 50 can be moved from one position to another within the intake member 18 by means of a lever 60 that engages the valve flap 50 or by other means.

In the operation of the mounted attachment 10, the rotary blade of the lawn mower creates a suction, which draws air through the air intake member, the air carrying dirt, leaves, etc. and passing into the cloth bag of the mower.

The attachment 10 can be made of metal, synthetic materials (e.g., fiberglass or plastic), or other materials and can be made either as an integral structure (i.e., a single piece) or from several parts separately made and joined together to form a unitary structure.

I claim:
1. A vacuum attachment for a power lawn mower, comprising:
   a. a cover member adapted to be mounted on the underside of said lawn mower, forming a vacuumed area therebetween;
   b. an air-intake member comprising a spout member having a forwardly-protruding nozzle and an inwardly-extending throat portion integrally connected to said cover, whereby air is drawn therethrough into said vacuumed area; and
   c. an air passage element comprising a trough portion integrally formed within said cover and disposed between said throat portion and said vacuumed area to provide air-flow communication between said air-intake member and said vacuumed area.

* * * * *